United States Patent [19]

Smith et al.

[11] Patent Number: 5,068,129
[45] Date of Patent: Nov. 26, 1991

[54] PROCESS FOR CONVERTING A FLUID SYSTEM OF A MACHINE FROM AN OIL BASED FLUID SYSTEM TO A WATER BASED FLUID SYSTEM

[76] Inventors: Morton R. Smith, Napoleon; James L. Maassel, New Bavaria, both of Ohio

[21] Appl. No.: 552,245

[22] Filed: Jul. 12, 1990

[51] Int. Cl.$^5$ ............................ B08B 3/08; B05D 7/22
[52] U.S. Cl. .................................... 427/239; 427/327; 427/435; 427/142; 134/22.19; 134/36; 134/38; 134/40; 252/162; 252/172; 165/133; 184/1.5; 184/6.21
[58] Field of Search .................. 134/22.19, 23, 36, 38, 134/90; 427/230, 235, 299, 327, 450.1, 435, 140, 239, 142; 252/162, 177; 165/133; 184/1.5, 6.21

[56] References Cited

U.S. PATENT DOCUMENTS

| | | | |
|---|---|---|---|
| 3,431,145 | 3/1969 | Riley | 134/22.19 |
| 4,033,784 | 7/1977 | Lawson et al. | 134/40 |
| 4,174,231 | 11/1979 | Hobgood | 134/40 |
| 4,396,436 | 8/1983 | Laemmle et al. | 134/22.19 |
| 4,925,496 | 5/1990 | Stonky et al. | 134/22.19 |

FOREIGN PATENT DOCUMENTS 3508526 6/1986 Fed. Rep. of Germany ...... 427/140

Primary Examiner—Stanley S. Silverman
Assistant Examiner—Neil M. McCarthy
Attorney, Agent, or Firm—Marshall & Melhorn

[57] ABSTRACT

A process for converting a fluid system of a machine from an oil based fluid system to a water based fluid system. A solvent and perfluoroethylene resin are added to the fluid system in sufficient amounts to remove extraneous matter from and coat the surfaces within the fluid system with the perfluoroethylene resin. The oil based fluid, solvent and perfluoroethylene resin are circulated throughout the fluid system for a time sufficient to remove extraneous matter and coat the surfaces. The fluid system is evacuated of the oil based fluid, solvent and residual perfluoroethylene resin, and a water based fluid is added to the fluid system.

11 Claims, 1 Drawing Sheet

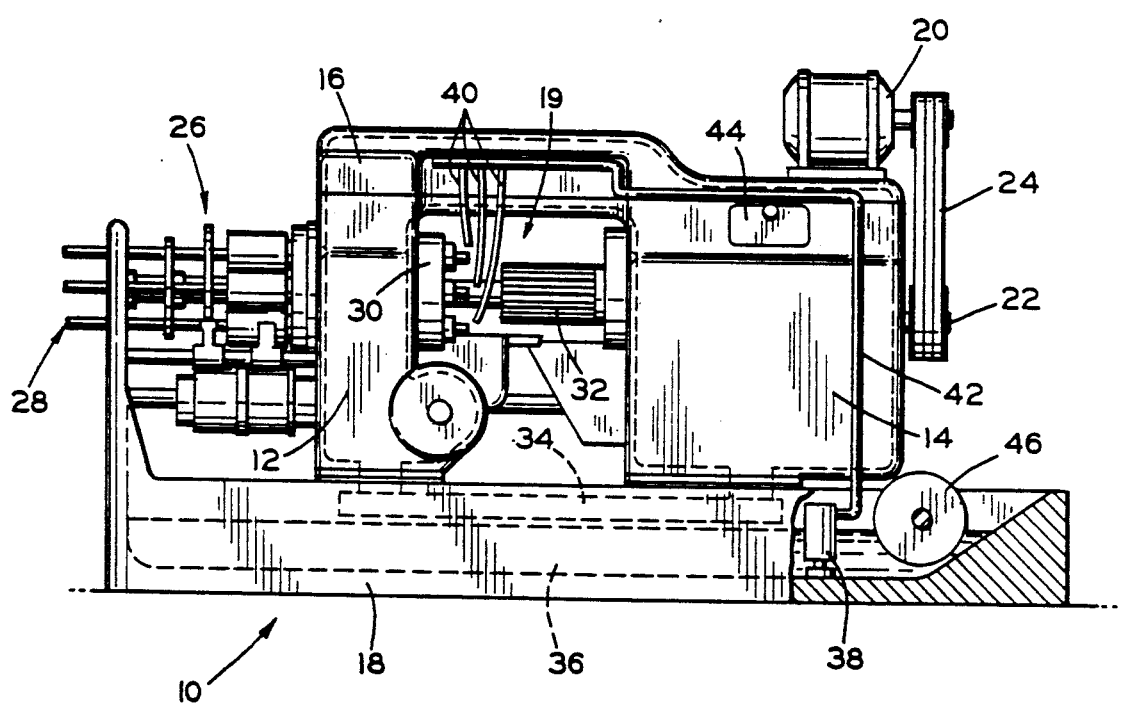

PROCESS FOR CONVERTING A FLUID SYSTEM OF A MACHINE FROM AN OIL BASED FLUID SYSTEM TO A WATER BASED FLUID SYSTEM

FIELD OF THE INVENTION

The present invention relates generally to a process for converting a fluid system of a machine from an oil based fluid system to a water based fluid system and, in particular, to a process for converting the coolant system of an automatic screw machine from an oil based coolant system to a water based coolant system.

BACKGROUND OF THE INVENTION

Machines of all types generally include an assortment of gears, bearings, slides and hydraulics, and a corresponding oil based fluid system to provide for the lubrication and cooling of such parts during operation of the machine. Users of such machines have heretofore typically avoided the use of water based fluid systems because, as has long been known, a major cause of fatigue and failure in machines of this type is water, which causes hydrogen embrittlement and rapid oxidation of the metal surfaces of the gears, bearings, etc.

Machines such as automatic screw machines typically include an oil based lubrication system to provide the necessary lubrication for the gears and bearings of the device, as well as an oil based coolant system to provide a cutting coolant for the machining area of the device. Although these devices are known to perform well with a water based coolant, users have been reluctant to use water based coolants for fear that the water will leach into or otherwise penetrate the seals to the lubrication system, contaminating the oil based lubrication system with water, and promoting the failure of the gears and bearings.

However, environmental concerns have recently caused a substantial increase in the cost of disposal of oil based fluids, which must be disposed of and replaced often in many applications. Additionally, oil based fluids present an unacceptable fire hazard in certain applications, such as in hydraulic systems which operate along side of welding operations. In such applications, users have been forced to utilize water based fluids, but with a substantial decrease in bearing life and corresponding increase in maintenance and replacement parts cost.

It can therefore be seen that it would be advantageous from environmental, safety and cost perspectives, to be able to convert a machine from an oil based fluid system to a water based fluid system if the conversion could be done in such a manner that the water based fluid did not cause hydrogen embrittlement, rapid oxidation, and the eventual fatigue and failure of the gears, bearings, etc. Conversion to a water based fluid system is advantageous as well in that a water based fluid dissipates heat away from gears, bearings, etc. more effectively than does an oil based fluid.

SUMMARY OF THE INVENTION

Accordant with the present invention, it has been discovered that a machine can be converted from an oil based fluid system to a water based fluid system by a novel process, comprising the steps of:

(A) adding sufficient amounts of a solvent and a perfluoroethylene resin to the oil based fluid in the fluid system of the machine to remove extraneous matter from the surfaces within the fluid system, and to coat the surfaces with perfluoroethylene resin;

(B) circulating the oil based fluid, solvent and perfluoroethylene resin throughout the fluid system for a time sufficient to remove extraneous matter from the surfaces within the fluid system of the machine, and to coat the surfaces with perfluoroethylene resin;

(C) evacuating the oil based fluid, solvent and residual perfluoroethylene resin from the fluid system of the machine; and (D) adding a water based fluid to the fluid system of the machine.

A machine may thereby be converted from an oil based fluid system to a water based fluid system without having the water which is introduced into the system harm the gears, bearings, etc. of the machine.

BRIEF DESCRIPTION OF THE DRAWINGS

The above, as well as other advantages of the present invention, will become readily apparent to those skilled in the art from the following detailed description of a preferred embodiment when considered in the light of the accompanying drawing, which is a schematic representation of an automatic screw machine on which the process of the present invention may be practiced.

DESCRIPTION OF THE PREFERRED EMBODIMENT

The process according to the present invention may be practiced to convert virtually any oil based fluid system in a machine to a water based fluid system. Thus, for example. the process can be practiced to convert an oil based lubrication system in a gear box to a water based lubrication system. Likewise, the process can be practiced to convert a hydraulic device from an oil based hydraulic fluid to a water based hydraulic fluid. For the purpose of illustration, the process of the present invention will be described with respect to the conversion of the coolant system of an automatic screw machine from an oil based coolant to a water based coolant.

Referring now to the drawing, there is illustrated generally at 10 a schematic representation of an automatic screw machine on which the present invention may be practiced. The screw machine 10 comprises a headstock section 12, gear box section 14, top section 16, pan 18, and machining area 19. A drive motor 20 is positioned on top section 16 above the gear box section 14, and is connected to a main drive shaft 22 by means of belts 24. A stock feeding mechanism 26 feeds bar stock 28 through the headstock section 12 to a spindle carrier 30 located in the machining area 19. A main tool carriage 32 extends into the machining area 19 from the gear box section 14. Various working attachments (not shown) such as threading, tapping and milling tools, are positioned on the main tool carriage 32 to machine the bar stock 28 in the machining area 19. The gear box section 14 houses various gears, bearings and slides (not shown) for carrying out the machining operations. The headstock section 12 houses various gears, bearings and slides (not shown) for feeding bar stock 28 into the machining area 19, and for rotating the spindle carrier 30.

The lubrication system of the screw machine 10 is formed within the headstock section 12, gear box section 14 and top section 16, and includes a lubricant reservoir 34. A pump (not shown) circulates the lubricant throughout the lubrication system. The lubricant is typically an oil based fluid, such as "MOBIL DTE", for example, commercially available from Mobil Oil Company. Fairfax. Virginia. U.S.A.

The coolant system comprises a coolant reservoir 36 located in the pan 18, a pump 38, and a series of nozzles 40 positioned in the machining area 19 The pump 38 draws the coolant from the coolant reservoir 36 and drives it through a conduit 42 to the nozzles 40. The coolant is forced out the ends of the nozzles 40 to the bar stock 28 and the machining tools. The coolant then simply runs down the sides of the screw machine 10 back into the coolant reservoir 36, where it is recirculated through the coolant system. The coolant is typically an oil based fluid, such as "SOHIO MULTI.CUT LDX". for example, commercially available from Sohio Oil Company, Cleveland, Ohio, U.S.A.

Accordant with the present invention, the coolant system of a screw machine 10 having an oil based lubrication system is converted from an oil based coolant system to a water based coolant system. It is noted that the lubrication system of the machine could be converted in accordance with the present invention from an oil based fluid system to a water based fluid system as well. However, for purposes of illustration, only conversion of the coolant system will be described.

The coolant system of the machine is converted from an oil based fluid system to a water based fluid system by initially adding a solvent to the coolant system in an amount sufficient to clean all of the surfaces within the coolant system, and a perfluoroethylene resin in an amount sufficient to impregnate all of the surfaces within the coolant system. The solvent and perfluoroethylene resin may be poured into the coolant reservoir 36 in the pan 18. The solvent is preferably a hydrocarbon solvent, such as an aliphatic naphtha, for example, suitable for removing extraneous matter, such as oil residue or varnish, from the surfaces within the coolant system of the machine. The perfluoroethylene resin preferably comprises a polytetrafluoroethylene resin. The solvent and the perfluoroethylene resin may be added as single mixture, such as that found in "MSI METAL TREATMENT FOR HIGH SPEED BEARINGS", commercially available from Macro Specialty Industries, Inc.. Napoleon, Ohio, USA. The mixture should be from 50 to 70% by volume aliphatic naphtha solvent with from 30 to 50% by volume perfluoroethylene resin, and is preferably about 61% by volume aliphatic naphta solvent with 39% by volume perfluoroethylene resin.

In a preferred embodiment, a solvent and perfluoroethylene resin, or solvent and perfluoroethylene resin mixture, is then added to the lubrication system of the machine. While the lubrication system will remain an oil based fluid system, once the coolant system has been converted to a water based fluid system, water from the coolant system of the machine will eventually penetrate the lubrication system. Again, solvent is added to the lubrication system in an amount sufficient to clean all of the surfaces within the system, and perfluoroethylene resin is added in an amount sufficient to impregnate all of the surfaces within the system. The solvent is preferably a hydrocarbon solvent, such as an aliphatic naphtha, suitable for removing extraneous matter, such as oil residue or varnish, from the surfaces within the lubrication system of the machine. The perfluoroethylene resin preferably comprises a polytetrafluoroethylene resin. The solvent and the perfluoroethylene resin may be added as single mixture, such as that found in "MSI METAL TREATMENT FOR HIGH SPEED BEARINGS". commercially available from Macro Specialty Industries, Inc. The mixture should be from 50 to 70% by volume aliphatic naphtha solvent with from 30 to 50% by volume perfluoroethylene resin, and is preferably about 61% by volume aliphatic naphtha solvent with 39% by volume perfluoroethylene resin. The solvent and perfluoroethylene resin may be added to the lubrication system through a port cover 44 in the top section 16 of the screw machine 10.

The machine is operated, circulating the oil based coolant, solvent and perfluoroethylene resin throughout both the coolant and lubrication systems, for a time sufficient to effect both the removal of extraneous matter and coating of all surfaces within both systems. The oil based coolant, solvent and perfluoroethylene resin is preferably circulated for at least one hour to remove the extraneous matter from the surfaces within each system. The machine should be operated for at least an additional twenty four hours to coat the surfaces with the perfluoroethylene resin. The machine is most preferably operated, circulating the oil based coolant, solvent and perfluoroethylene resin, for at least fifty hours to be certain that all surfaces have cleaned and have been impregnated and coated with the perfluoroethylene resin. As the machine operates and the oil based coolant, solvent and perfluoroethylene resin are circulated throughout both systems, the perfluoroethylene resin penetrates and fills the pores in the surfaces.

The oil based coolant, solvent and perfluoroethylene resin is then removed from the coolant system in any known manner, such as by pumping the oil based coolant, solvent and residual perfluoroethylene resin from the coolant reservoir 36. After all of the oil based coolant has been removed, the coolant reservoir 36 and the remainder of the coolant system, as well as the machining area 19, are thoroughly cleaned of any remaining residue. A perfluoroethylene resin film surface is left on all surfaces within the lubrication and coolant systems which has a low coefficient of friction and is impervious to acids, protecting the surfaces from hydrogen embrittlement and rapid oxidation which would otherwise be caused by water.

A water based coolant is then added to the coolant system of the machine. The water based coolant is preferably a soluble oil in water emulsion. To act as a replenishing supply of the perfluoroethylene resin, a small amount of an activator comprising a perfluoroethylene resin in a soluble oil is preferably added to the water based coolant. In the preferred embodiment, about four fluid ounces of activator is added for each gallon of water based coolant added to the coolant system.

The screw machine 10 is preferably provided with a device, such as skimmer disc 46, for removing tramp oil from the surface of the water based coolant in the coolant reservoir 36. This helps to maintain a clean water based coolant throughout the coolant system.

In accordance with the provisions of the patent statutes, the present invention has been described in what is considered to represent its preferred embodiment. However. it should be noted that the invention can be practiced otherwise than as specifically illustrated and described without departing from its spirit or scope.

What is claimed is:

1. A process for converting a fluid system of a machine from an oil based fluid system to a water based fluid system, comprising the steps of:

(A) adding sufficient amounts of a solvent and a perfluoroethylene resin to the oil based fluid in the fluid system of the machine to remove oil residue or varnish from the surfaces within the fluid system, and to coat the surfaces with perfluoroethylene resin;

(B) circulating the oil based fluid, solvent and perfluoroethylene resin throughout the fluid system for a time sufficient to remove oil residue or varnish from the surfaces within the fluid system of the machine, and to coat the surfaces with perfluoroethylene resin;

(C) evacuating the oil based fluid, solvent and residual perfluoroethylene resin from the fluid system of the machine; and (D) adding a water based fluid to the fluid system of the machine.

2. A process according to claim 1, wherein step B further comprises the steps of circulating the oil based fluid, solvent and perfluoroethylene resin throughout the fluid system for a time sufficient to remove oil residue or varnish from the surfaces within the fluid system of the machine, and circulating the oil based fluid, solvent and perfluoroethylene resin throughout the fluid system for an additional time sufficient to further coat the surfaces within the fluid system with perfluoroethylene resin.

3. The process according to claim 2, wherein the oil based fluid, solvent and perfluoroethylene resin are circulated throughout the fluid system for at least one hour to remove oil residue or varnish from the surfaces within the fluid system of the machine.

4. The process according to claim 3, wherein the oil based fluid, solvent and perfluoroethylene resin are circulated throughout the fluid system for at least an additional twenty four hours to coat the surfaces within the fluid system with perfluoroethylene resin.

5. The process according to claim 1, further comprising the step of providing the machine with a device for removing tramp oil from the surface of the water based fluid.

6. The process according to claim 1, wherein the water based fluid added to the machine comprises an oil in water emulsion.

7. The process according to claim 1, wherein the solvent comprises an aliphatic naphtha solvent.

8. The process according to claim 1, wherein the perfluoroethylene resin comprises a polytetrafluoroethylene resin.

9. The process according to claim 6, further comprising the step of adding polytetrafluoroethylene resin in an oil to the water based fluid, said polytetrafluoroethylene resin acting as a replenishing supply of the perfluoroethylene resin initially added to the system.

10. A process for converting a fluid system of a machine from an oil based fluid system to a water based fluid system, the steps comprising:

(A) adding sufficient amounts of an aliphatic naphtha solvent and a polytetrafluoroethylene resin to the oil based fluid in the fluid system of the machine to remove oil residue or varnish from the surfaces within the fluid system, and to coat the surfaces with polytetrafluoroethylene resin;

(B) circulating the oil based fluid, solvent and polytetrafluoroethylene resin throughout the fluid system for at least twenty five hours to remove oil residue or varnish from the surfaces within the fluid system of the machine, and to coat the surfaces with polytetrafluoroethylene resin;

(C) evacuating the oil based fluid, solvent and residual polytetrafluoroethylene resin from the fluid system of the machine;

(D) adding an oil in water emulsion to the fluid system of the machine;

(E) adding polytetrafluoroethylene resin in an oil to the water based fluid, said polytetrafluoroethylene resin acting as a replenishing supply of the polytetrafluoroethylene resin initially added to the system.

11. A process for converting the coolant system of an automatic screw machine having an oil based lubrication system from an oil based coolant to a water based coolant, the steps comprising:

(A) adding sufficient amounts of a solvent and a perfluoroethylene resin to the coolant system of the machine to remove oil residue or varnish from the surfaces within the fluid system, and to coat the surfaces with perfluoroethylene resin;

(B) adding sufficient amount of a solvent and a perfluoroethylene resin to the lubrication system of the machine to remove oil residue or varnish from the surfaces within the fluid system, and to coat the surfaces with perfluoroethylene resin;

(C) circulating the oil based fluid, solvent and perfluoroethylene resin throughout the coolant and lubricant systems for a time sufficient to remove oil residue or varnish from the surfaces within both systems of the machine, and to coat the surfaces within each system with perfluoroethylene resin;

(D) evacuating the oil based fluid, solvent and residual perfluoroethylene resin from the coolant system of the machine; and (E) adding a water based coolant to the coolant system of the machine;

(F) adding polytetrafluoroethylene resin in an oil to the water based fluid, said polytetrafluoroethylene resin acting as a replenishing supply of the perfluoroethylene resin initially added to the system; and (G) providing the machine with a device for removing tramp oil from the surface of the oil in water emulsion.

* * * * *